(12) United States Patent
Park et al.

(10) Patent No.: US 11,656,952 B2
(45) Date of Patent: May 23, 2023

(54) RELIABLE KEY-VALUE STORE WITH WRITE-AHEAD-LOG-LESS MECHANISM

(71) Applicant: SAMSUNG ELECTRONICS CO., LTD., Suwon-si (KR)

(72) Inventors: Heekwon Park, Cupertino, CA (US); Ho bin Lee, San Jose, CA (US); Ilgu Hong, Santa Clara, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 16/843,809

(22) Filed: Apr. 8, 2020

(65) Prior Publication Data

US 2021/0089408 A1    Mar. 25, 2021

Related U.S. Application Data

(60) Provisional application No. 62/903,651, filed on Sep. 20, 2019.

(51) Int. Cl.
| | |
|---|---|
| *G06F 7/02* | (2006.01) |
| *G06F 16/00* | (2019.01) |
| *G06F 11/14* | (2006.01) |
| *G06F 16/22* | (2019.01) |
| *H04L 9/08* | (2006.01) |
| *G06F 16/901* | (2019.01) |
| *H04L 9/00* | (2022.01) |

(52) U.S. Cl.
CPC ...... *G06F 11/1466* (2013.01); *G06F 16/2282* (2019.01); *G06F 16/9024* (2019.01); *H04L 9/0894* (2013.01); *G06F 2201/80* (2013.01); *H04L 9/50* (2022.05)

(58) Field of Classification Search
CPC ............. G06F 11/1466; G06F 16/2282; G06F 16/9024; G06F 2201/80; H04L 9/0894; H04L 9/50
See application file for complete search history.

(56) References Cited

U.S. PATENT DOCUMENTS

| | | | |
|---|---|---|---|
| 9,372,879 B1* | 6/2016 | Evenson | ............. G06F 16/2228 |
| 2010/0005077 A1 | 1/2010 | Krishnamurthy et al. | |
| 2014/0059552 A1 | 2/2014 | Cunningham et al. | |
| 2015/0178243 A1 | 6/2015 | Lowery et al. | |
| 2017/0228247 A1 | 8/2017 | Aron et al. | |
| 2017/0262461 A1 | 9/2017 | Androulaki et al. | |
| 2017/0329828 A1 | 11/2017 | Gupta et al. | |
| 2020/0133800 A1* | 4/2020 | Varadan | ............. G06F 11/1441 |
| 2020/0333968 A1* | 10/2020 | Bortnikov | ............. G06F 3/0685 |
| 2020/0334258 A1* | 10/2020 | Bortnikov | ......... G06F 16/24552 |

* cited by examiner

*Primary Examiner* — Bruce M Moser
(74) *Attorney, Agent, or Firm* — Lewis Roca Rothgerber Christie LLP (57) ABSTRACT

Provided is a method of linking multiple KV blocks in a KV chain to ensure data consistency, the method including allocating an internal key to both a first KV block and a recovery begin internal key, allocating a next internal key that is different from the internal key and that corresponds to a next KV block, and encapsulating respective user key values in the first KV block and in the next KV block, wherein the first KV block is accessed by reading the recovery begin internal key, and wherein the next KV block is accessed by reading the next internal key of the first KV block.

20 Claims, 6 Drawing Sheets

RELIABLE KEY-VALUE STORE WITH WRITE-AHEAD-LOG-LESS MECHANISM

CROSS-REFERENCE TO RELATED APPLICATION(S)

This application claims priority to and the benefit of U.S. Provisional Application Ser. No. 62/903,651, filed Sep. 20, 2019, entitled RELIABLE KEY-VALUE STORE WITH WRITE-AHEAD-LOG-LESS MECHANISM, the contents of which is incorporated herein in its entirety.

FIELD

One or more embodiments of the present disclosure relate generally to data storage.

BACKGROUND

Some databases and file systems write the same data twice to ensure consistency. For example, some key-value (KV) stores use a write-ahead log (WAL) as a mechanism for ensuring data consistency to support reliability of the KV store.

That is, in some databases, a KV block may be initially written using a WAL, which may a significant bottleneck in supporting system reliability, prior to updating the actual data and the metadata that is used to aid in data recovery in the event of a system crash/power outage (system failure). Thereafter, when metadata corresponding to the KV block is updated, the KV block is written a second time.

Relational databases and file systems also write data twice for consistency. For example, a relational database management system may use a double write with a storage engine, while other systems may use a journaling file system.

Accordingly, by writing data twice, the system experiences added overhead (e.g., double the bandwidth being used), thereby causing input-output (IO) congestion and increasing the write amplification factor (WAF).

SUMMARY

Embodiments described herein provide improvements to data storage.

According to some embodiments of the present disclosure, there is provided a method of linking multiple KV blocks in a KV chain to ensure data consistency, the method including allocating an internal key to both a first KV block and a recovery begin internal key, allocating a next internal key that is different from the internal key and that corresponds to a next KV block, and encapsulating respective user key values in the first KV block and in the next KV block, wherein the first KV block is accessed by reading the recovery begin internal key, and wherein the next KV block is accessed by reading the next internal key of the first KV block.

The method may further include updating all of the user key values of the first KV block, generating or updating a metadata table to reference the first KV block, marking the first KV block as being eligible for deletion from a KV device, and updating the recovery begin internal key to be the next internal key of the first KV block.

The method may further include statically assigning a recovery begin key, wherein the recovery begin internal key is accessed by reading the recovery begin key.

The method may further include, after a system failure of a KV device in which the first KV block and next KV block are stored reading the recovery begin key from the KV device, retrieving the recovery begin internal key using the recovery begin key, locating and reading the first KV block using the recovery begin internal key, retrieving the next internal key of the next KV block from the first KV block, and locating and reading the next KV block using the next internal key.

The method may further include reading an additional next internal key as part of a device value of the next KV block, the additional next internal key corresponding to a subsequent next KV block, locating and reading the subsequent next KV block using the additional next internal key, and repeating until a corresponding next internal key corresponds to a KV block that is not found in the KV device.

The method may further include determining that the first KV block has no valid user key, marking the first KV block as eligible for deletion, and updating the recovery begin internal key to be the next internal key of the first KV block, the next internal key corresponding to a subsequent KV block.

The next internal key may include part of a device value in the first KV block, and includes a device key for the next KV block.

According to other embodiments of the present disclosure, there is provided a system for ensuring data consistency by linking multiple KV blocks in a KV chain, the system including a key value store engine configured to allocate an internal key to both a first KV block and a recovery begin internal key, allocate a next internal key that is different from the internal key and that corresponds to a next KV block, and encapsulate respective user key values in the first KV block and in the next KV block, wherein the first KV block is accessed by reading the recovery begin internal key, and wherein the next KV block is accessed by reading the next internal key of the first KV block.

The key value store engine may be further configured to update all of the user key values of the first KV block, generate or update a metadata table to reference the first KV block, mark the first KV block as being eligible for deletion from a KV device, and update the recovery begin internal key to be the next internal key of the first KV block.

The key value store engine may be further configured to statically assign a recovery begin key, wherein the recovery begin internal key is accessed by reading the recovery begin key.

The key value store engine may be further configured to after a system failure of a KV device in which the first KV block and next KV block are stored read the recovery begin key from the KV device, retrieve the recovery begin internal key using the recovery begin key, locate and read the first KV block using the recovery begin internal key, retrieve the next internal key of the next KV block from the first KV block, and locate and reading the next KV block using the next internal key.

The key value store engine may be further configured to read an additional next internal key as part of a device value of the next KV block, the additional next internal key corresponding to a subsequent next KV block, locate and read the subsequent next KV block using the additional next internal key, and repeat until a corresponding next internal key corresponds to a KV block that is not found in the KV device.

The key value store engine may be further configured to determine that the first KV block has no valid user key, mark the first KV block as eligible for deletion, and update the recovery begin internal key to be the next internal key of the first KV block, the next internal key corresponding to a subsequent KV block.

The next internal key may include part of a device value in the first KV block, and includes a device key for the next KV block.

According to yet other embodiments of the present disclosure, there is provided a non-transitory computer readable medium implemented on a system for linking multiple KV blocks in a KV chain to ensure data consistency, the non-transitory computer readable medium having computer code that, when executed on a processor, implements a method of data storage, the method including allocating an internal key to both a first KV block and a recovery begin internal key, allocating a next internal key that is different from the internal key and that corresponds to a next KV block, and encapsulating respective user key values in the first KV block and in the next KV block, wherein the first KV block is accessed by reading the recovery begin internal key, and wherein the next KV block is accessed by reading the next internal key of the first KV block.

The computer code, when executed on the processor, may further implement the method of data storage by updating all of the user key values of the first KV block, generating or updating a metadata table to reference the first KV block, marking the first KV block as being eligible for deletion from a KV device, and updating the recovery begin internal key to be the next internal key of the first KV block.

The computer code, when executed on the processor, may further implement the method of data storage by statically assigning a recovery begin key, wherein the recovery begin internal key is accessed by reading the recovery begin key.

The computer code, when executed on the processor after a system failure of a KV device in which the first KV block and next KV block are stored, may further implement the method of data storage by reading the recovery begin key from the KV device, retrieving the recovery begin internal key using the recovery begin key, locating and reading the first KV block using the recovery begin internal key, retrieving the next internal key of the next KV block from the first KV block, and locating and reading the next KV block using the next internal key.

The computer code, when executed on the processor, may further implement the method of data storage by reading an additional next internal key as part of a device value of the next KV block, the additional next internal key corresponding to a subsequent next KV block, locating and reading the subsequent next KV block using the additional next internal key, and repeating until a corresponding next internal key corresponds to a KV block that is not found in the KV device.

The computer code, when executed on the processor, may further implement the method of data storage by determining that the first KV block has no valid user key, marking the first KV block as eligible for deletion, and updating the recovery begin internal key to be the next internal key of the first KV block, the next internal key corresponding to a subsequent KV block.

Accordingly, the system of embodiments of the present disclosure is able to improve by data storage by reducing the number of writes needed to ensure data consistency.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present disclosure enable construction of recovery information by a storage device without using a write-ahead log (WAL) thereby improving the field of data storage by reducing overhead, input-output (IO) congestion, and/or write amplification factor (WAF).

Figure 1:
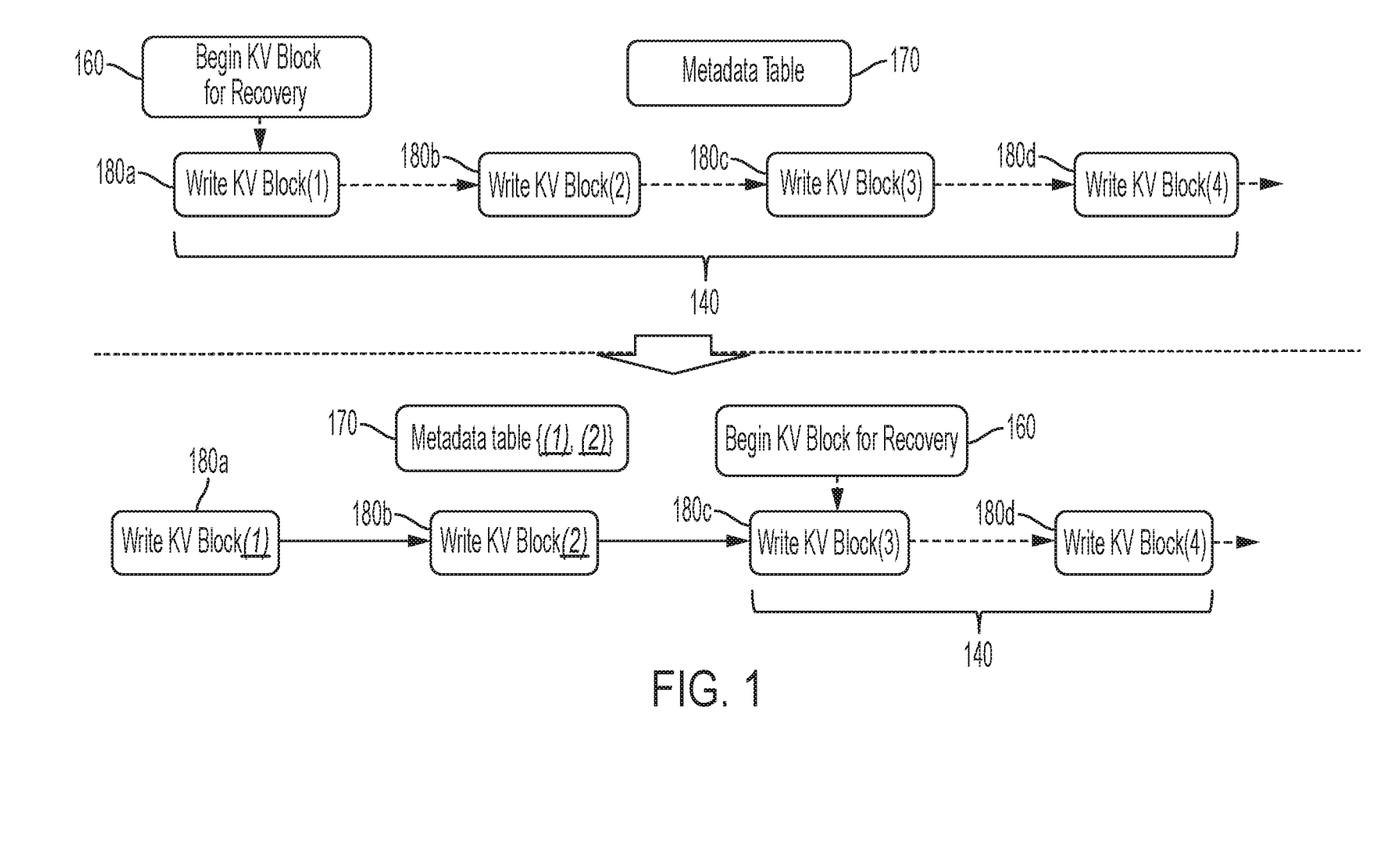
FIG. 1 is a block diagram depicting an overall concept of a WAL-less recovery mechanism, according to embodiments of the present disclosure.

FIG. 1 is a block diagram depicting an overall concept of a WAL-less recovery mechanism, according to embodiments of the present disclosure.

Referring to FIG. 1, a recovery mechanism that obviates the need for a write-ahead-log (WAL) according to embodiments of the present disclosure may generally function as described herein. A "begin KV block" 160 may be stored in a database/file system (e.g., the database/file system 210 shown in FIGS. 2A and 2B), and written to a corresponding KV device (e.g., the KV device 220b shown in FIG. 2B). The begin KV block 160 is used to initiate recovery in the event of a crash or unexpected power outage (e.g., a system failure). By using a KV store engine (e.g., the KV store engine 350 of FIG. 3), the begin KV block 160 is linked to a first KV block 180a by including an internal key (iKey) of the first KV block 180a in the begin KV block 160. That is, the KV store engine keeps the begin KV block 160, and updates the begin KV block 160 whenever the first KV block 180a is changed. Similarly, the KV store engine links the first KV block 180a to a second KV block 180b by including the iKey of the second KV block 180b in the first KV block 180a. The second KV block 180b is then further linked to a third KV block 180c in a similar manner, which is linked to a fourth KV block 180d in turn, etc. Accordingly, the first through fourth KV blocks 180a-180d form a KV chain, and are included in a recovery range 140 in the event of a system failure. It should be noted that none of the KV blocks 180a-180d within the recovery range 140 can be deleted even when the blocks are updated. Instead, to prevent truncating the KV chain, only keys outside of the recovery range 140 can be deleted. Furthermore, the recovery range 140 can be extended later with upcoming KV Blocks.

Thereafter, for example, the key values of the first and second KV blocks 180a and 180b may be updated or written by the database/file system to one or more corresponding KV devices. Then the metadata table 170 can be updated to indicate that the first and second KV blocks 180a and 180b have been successfully updated or written. Once the metadata table 170 is updated, the begin KV block 160 can be updated to include the iKey of the third KV block 180c to instead be linked to the third KV block 180c. In accordance therewith, the recovery range 140 can be updated to exclude the first and second KV blocks 180a and 180b. The first and second KV blocks 180a and 180b may be then marked as eligible for deletion.

Accordingly, in the event of a system failure, because the first and second KV blocks 180a and 180b have been successfully updated or written prior to the system failure, as noted by the metadata table 170, recovery may begin without redundantly updating the first and second KV blocks 180a and 180b by updating the begin KV block 160 to correspond to the third KV block 180c such that the recovery range 140 begins at the third KV block 180c.

Figure 2A:
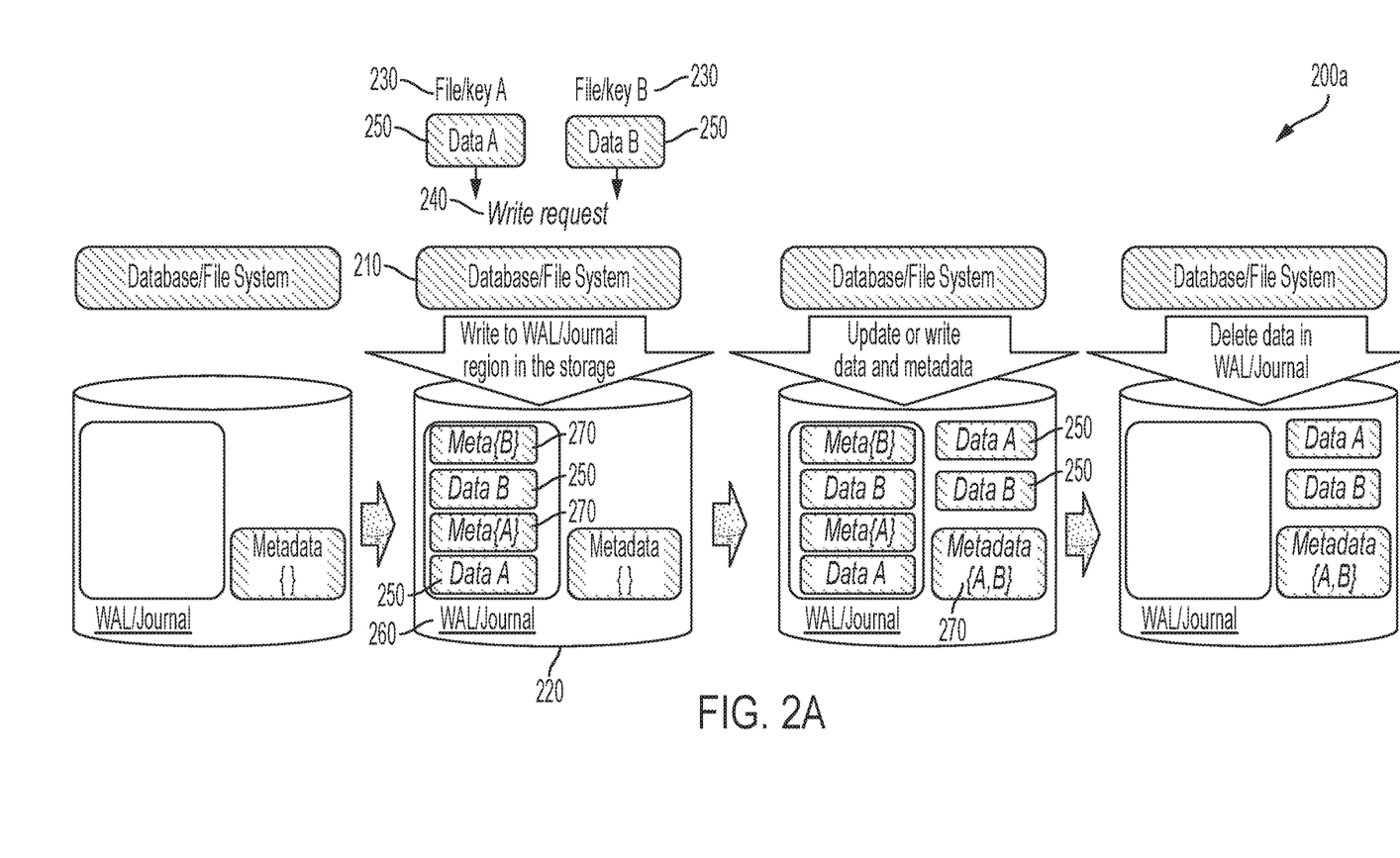
FIG. 2A is a block diagram depicting a mechanism for ensuring system consistency.

FIG. 2A is a block diagram depicting a mechanism for ensuring system consistency.

Referring to FIG. 2A, in an example system 200a, a database/file system 210 and a corresponding block device 220a are initialized, and one or more files/keys 230 may be submitted in a write request 240 to the database/file system 210 to have corresponding data 250 (e.g., user key values) written to the block device 220a.

Thereafter, the database/file system 210 writes to a write-ahead-log (WAL)/journal region 260 in the block device 220a to have the data 250 and metadata 270 corresponding to the data 250 written to the WAL/journal 260.

Then, the database/file system 210 updates or writes the data 250 and the metadata 270 a second time to the storage of the block device 220a. Finally, after the data 250 and the metadata 270 are successfully written to the block device 220a, the data 250 and the metadata 270 may be deleted from the WAL/journal 260.

Figure 2B:
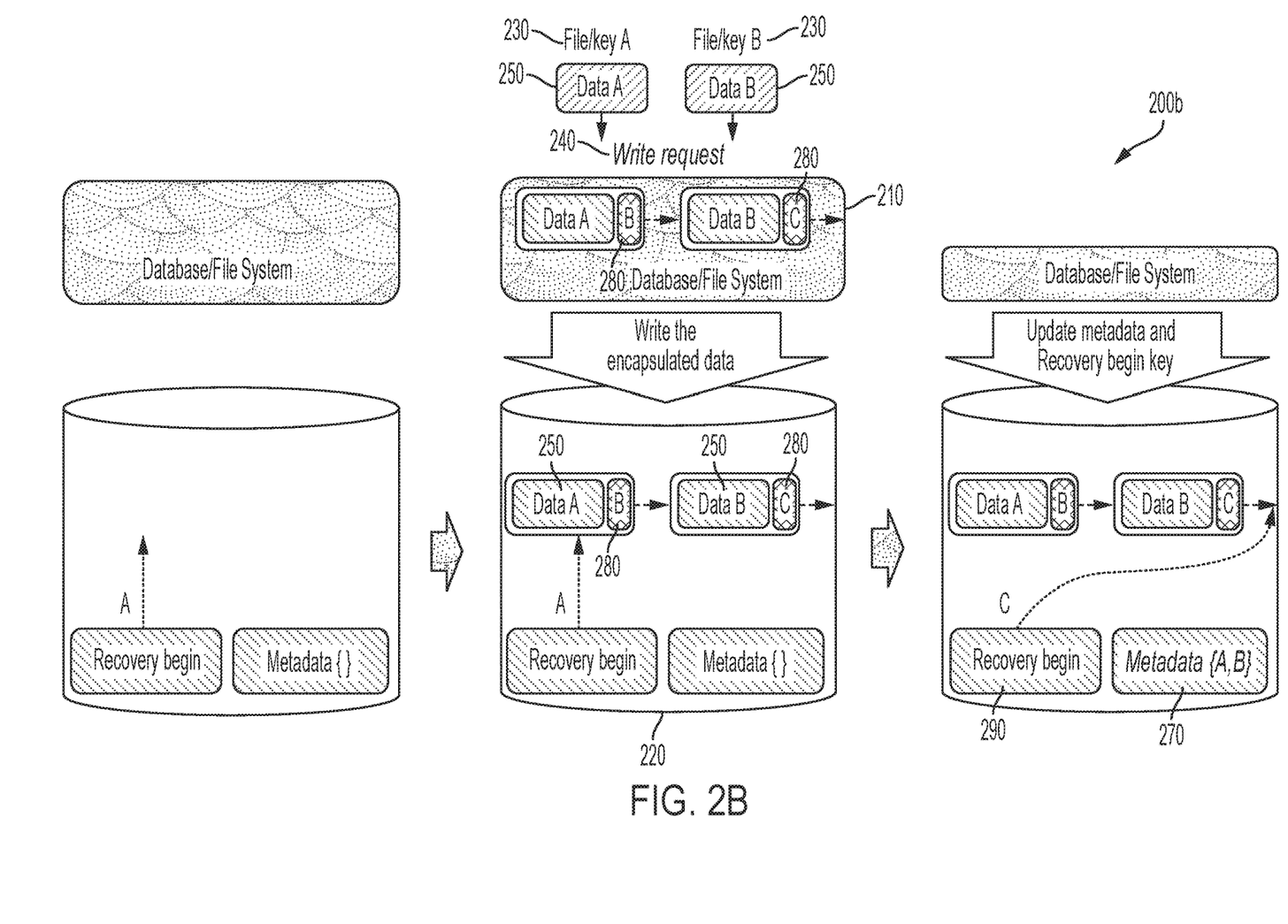
FIG. 2B is a block diagram depicting a WAL-less recovery mechanism for ensuring system consistency, according to embodiments of the present disclosure.

FIG. 2B is a block diagram depicting a WAL-less recovery mechanism for ensuring system consistency, according to embodiments of the present disclosure.

Referring to FIG. 2B, in a system 200b according to embodiments of the present disclosure, and similar to the system 200a using the block device 220a described above, a database/file system 210 and KV device 220b are initialized, and one or more files/keys 230 may be submitted for a write request 240 to the database/file system 210 to have corresponding data 250 (e.g., user key values) written to the KV device 220b.

However, unlike the system 200a of FIG. 2A, which uses a write-ahead log (WAL)/journal that is implemented based on block devices 220a, the system 200b of various embodiments is instead implemented based on KV devices. The system 200b of FIG. 2B is able to implement a WAL-Less mechanism (e.g., a mechanism that obviates the need to use a journal or WAL), thereby enabling the elimination of overhead in a KV device-based database/filesystem otherwise associated with a block device-based database/filesystem.

Further, unlike the system 200a described above, the database/file system 210 of the system 200b of embodiments of the present disclosure encapsulates the data 250 and a file/key 230, along with an iKey for indicating a subsequent KV block (described further below with reference to FIG. 3), contained in one or more respective KV blocks 280. Further, the system 200b links the KV blocks 280 together in a KV chain, and then writes the KV blocks 280 to the KV device 220b by using the iKey indicating the next KV block. The respective KV blocks 280 may be linked, or chained, together in the KV chain by including an iKey of a subsequent KV block 280 within the data of the immediately preceding KV block 280 (e.g., as a portion of a device value). The database/file system 210 may also link a recovery begin block 290 to a first KV block of the KV blocks 280 by including an iKey of the first KV block in the recovery begin block 290 to enable initiation of recovery following a system failure.

Once it is determined that the encapsulated data 250 and the KV blocks 280 have been successfully written to the KV device 220b, the database/file system 210 may update the metadata 270 in the KV device 220b corresponding to the written encapsulated data 250 to indicate that the KV blocks 280 have been successfully written, and to indicate a location thereof. Then, the database/file system 210 may update the recovery begin block 290 with an iKey of a subsequent KV block 280 that has not had metadata 270 corresponding thereto updated in the KV device 220b.

For example, the first KV block 280 in the KV chain that has not been successfully written to the KV device 220b or has not had its corresponding metadata 270 updated, may correspond to the iKey updated in the recovery begin block 290, even if there is another KV block 280 further down the KV chain that has been both successfully written to the KV device 220b and has had its corresponding metadata 270 updated, thereby ensuring data consistency in the event of a system failure.

Accordingly, as shown above, the WAL/journal 260 of a system 200a may be omitted in accordance with the disclosed embodiments.

Figure 3:
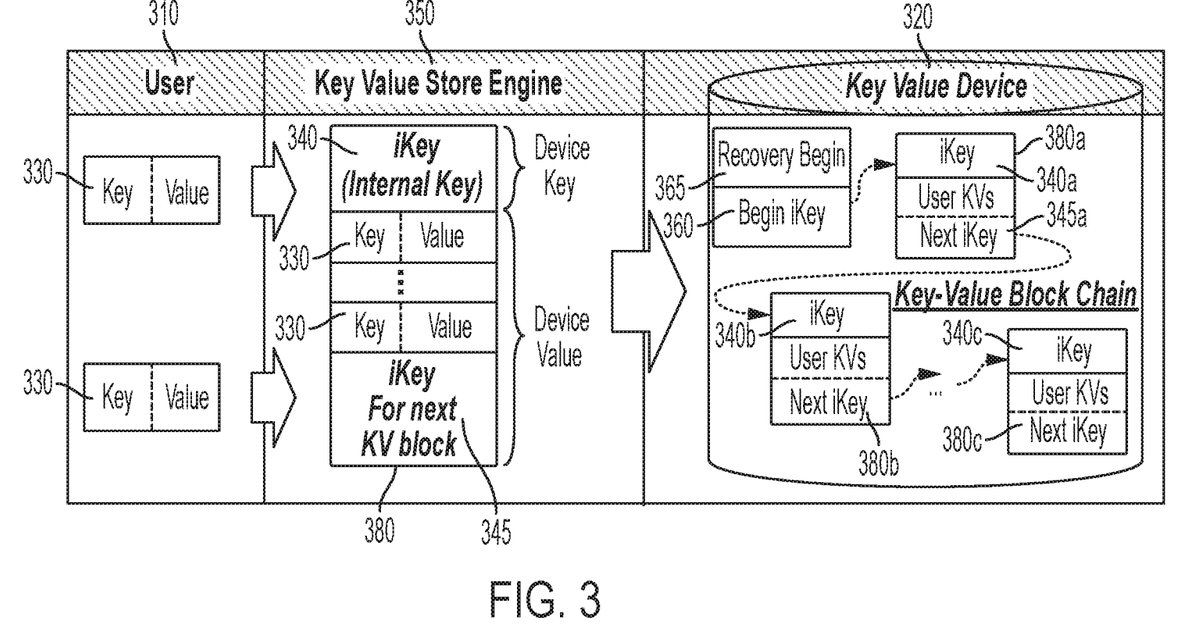
FIG. 3 is a block diagram depicting a method of generating a KV chain in a KV device, according to embodiments of the present disclosure.

FIG. 3 is a block diagram depicting a method of generating a KV chain in a KV device, according to embodiments of the present disclosure.

Referring to FIG. 3, a user 310 may seek to have one or more user key values 330 written to a KV store/database (e.g., in a KV device 320). In accordance with the user's write request, a KV store engine 350 insert the user key values 330 into the KV block 380 as part of a device value of the first KV block 380a. That is, user key values 330 may be encapsulated by a respective KV block 380.

The KV store engine 350 may also allocate an iKey 340 for a first KV block 380a as a device key of the first KV block 380a. However, it should be noted that, in some embodiments, the iKey 340 may be a user key instead of a device key. Further, the iKeys 340 can be numbers or strings, as long as the iKeys 340 are unique (even for the same user key).

The iKey 340a of the first KV block 380a may be recorded as a begin iKey 360 (e.g., a recovery begin internal key) in the KV device 320 to enable retrieval of the recovery data. Meanwhile, a recovery begin key 365 may be used as the key of the recovery data. The recovery begin key 365 may be statically assigned by the KV store engine 350, and may remain unchanged. Contrastingly, the begin iKey 360 is a value of the recovery data that is included with the recovery begin key 365, and may be updated, as will be described below.

In addition to the user key values 330, the KV store engine 350 may also insert a value of an iKey 340b for a second KV block 380b into the first KV block 380a as another part of the device value of the first KV block 380a. That is, each KV block 380 may also include a "next iKey" 345 for indicating a subsequent KV block 380, which may have not yet been created at the time the next iKey 345 is inserted in the KV block 380. The next iKey 345, like the iKey 340, may be preallocated at the time of establishing the database.

The above process may be repeated for multiple KV blocks (e.g., wherein an iKey 340c for the third KV block 380c is included as part of the device value as the next iKey 345b of the second KV block 380b, etc.). Accordingly, each KV block 380 generally contains a unique iKey 340, which may be assigned in the host side, one or more user key values 330, and a next iKey 345 for indicating a next KV block 380, wherein the next iKey 345a of a first KV block 380a will refer to the iKey 340b of a second KV block 380b in a manner that is similar to how the begin iKey 360 refers to the iKey 340 of the first KV block in the KV chain. Accordingly, the order of the KV blocks 380 in the KV chain is embedded in the KV blocks 380, and the next iKey 345 enables recovery following a system failure, as will be discussed further below.

By each KV block 380 including the information described above, each KV block 380 has a link for linking itself with a next KV block 380 (e.g., a subsequent KV block), thereby forming a KV chain (e.g., a chain of KV blocks 380). For the last KV block 380 in the KV chain, an iKey is still assigned as the iKey 340 for the next KV block 380, even though the iKey 340 for that next KV block does not exist in the KV device 320. Accordingly, if the KV block 380 doesn't exist in the KV device 320, then the end point for recovery has been reached.

It should be noted that the next iKey 345 does not necessarily refer to a physically adjacent KV block 380, as the KV blocks 380 need not be physically consecutive blocks. For example, in some embodiments, a next KV block 380 may be determined by a time order instead of a "key" order. For example, a key order may be 1→2→3→4→5, while a write order (or time order) may be 3→1→2→5→4. Accordingly, the KV chain order would be 3→1→2→5→4.

Accordingly, one or more KV blocks 380 may be recovered and may be written to the KV device 320 following a system failure by using the recovery begin key 365 and various pre-allocated iKeys 340 respectively corresponding to the KV blocks 380. Thus, the KV device 320 ensures atomic writing using single-KV-block atomicity.

Figure 4:
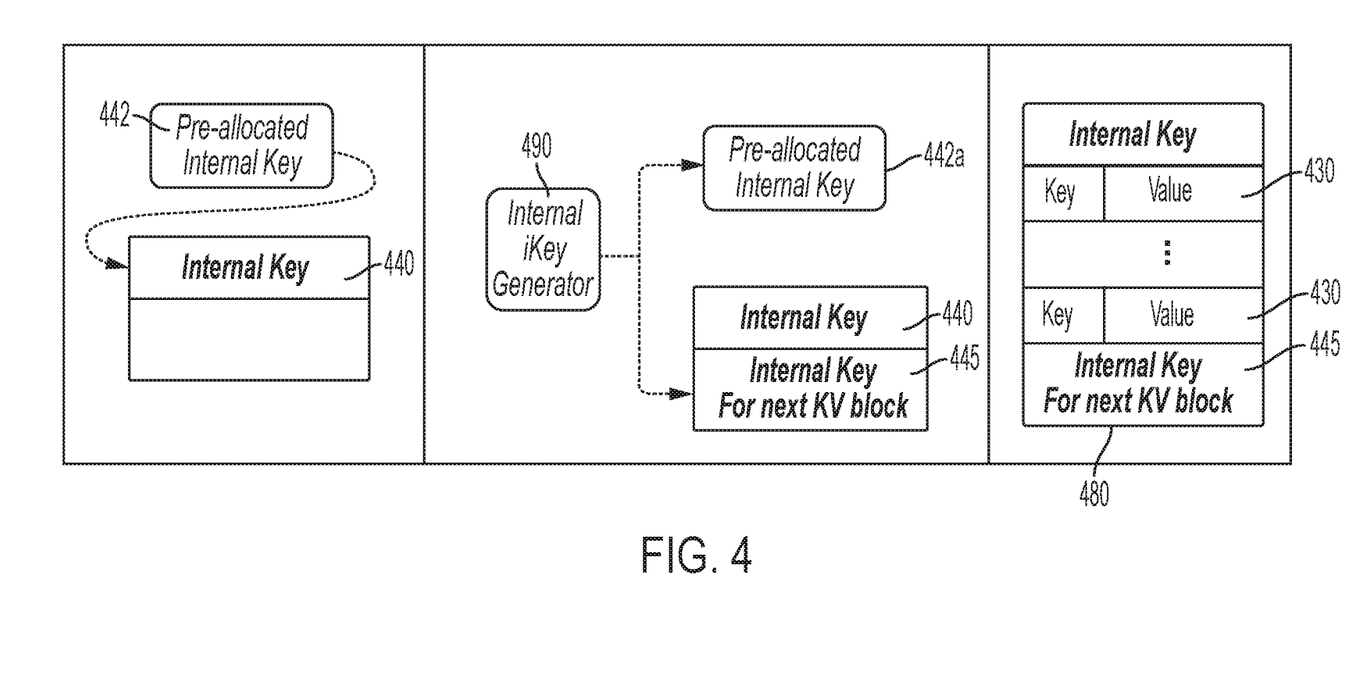
FIG. 4 is a block diagram depicting a method of generating a KV block to be used in a KV chain in a KV device, according to embodiments of the present disclosure.

FIG. 4 is a block diagram depicting a method of generating a KV block to be used in a KV chain in a KV device, according to embodiments of the present disclosure.

To summarize, and referring to FIG. 4, upon establishing the database, an initial preallocated iKey 442 is used as the iKey 440 of a current KV block 480. Further, the iKey 440 of the first KV block 480 in the KV chain is stored as the begin iKey in the KV device (e.g., the begin iKey 360 in the KV device 320 of FIG. 3).

Then, an iKey generator 490 may be used to generate a new iKey, to update the preallocated iKey 442, because the initial preallocated iKey 442 cannot be used for a subsequent KV block, as the initial pre-allocated iKey 442 has already been used for the current KV block 480, and as the new iKey will be used for a subsequent/next KV block 480. The current KV block 480 may use the initial preallocated iKey 442.

Accordingly, the preallocated iKey 442 may be used to generate a new preallocated iKey 442a, such that the updated preallocated iKey 442a can be used as the iKey for a subsequently created KV block. For example, the iKey Generator 490 may generate a new preallocated iKey 442, and may then update the preallocated iKey 442. The new preallocated iKey 442 may also be stored in an "Internal Key For Next KV Block" (e.g., a next iKey 445). That is, the iKey generator 490 generates a preallocated iKey 442 that is used as the iKey 440 for a KV block 480, and then generates another pre-allocated iKey 442a as the next iKey 445 corresponding to the iKey of a next (future) KV block.

That is, the internal iKey Generator 490 may generate the unique new iKey, which does not have dependency with the previously mentioned initial preallocated iKey 442. Further, the unique new iKey may be concurrently stored in both an updated preallocated iKey 442a and in a next iKey 445 for a next KV block, such that the updated preallocated iKey 442a and the next iKey 445 are the same iKey.

The internal iKey Generator 490 may generate only a single iKey at a time. Then, the generated iKey may be used/written for/to both the preallocated iKey 442a and the next iKey 445. Additionally, the used initial iKey 440 includes the previously assigned iKey 440 that is linked to the initial preallocated iKey 442.

The iKey generator 490 may then add the updated preallocated iKey 442a to the KV block 480 as the next iKey 445 corresponding to the subsequent KV block, while also adding the updated iKey 442a as the subsequent iKey for the subsequent KV block. That is, the updated preallocated iKey 442a will be used for both the iKey of a next KV block, and the next iKey 445 of the current KV block 480.

Thereafter, after generating and inserting the initial iKey 440 for the current block 480 and the next iKey 445 for the next KV block 480, the initial iKey 440, the next iKey 445, and the user key values 430 can be inserted into the KV block 480.

Figure 5:
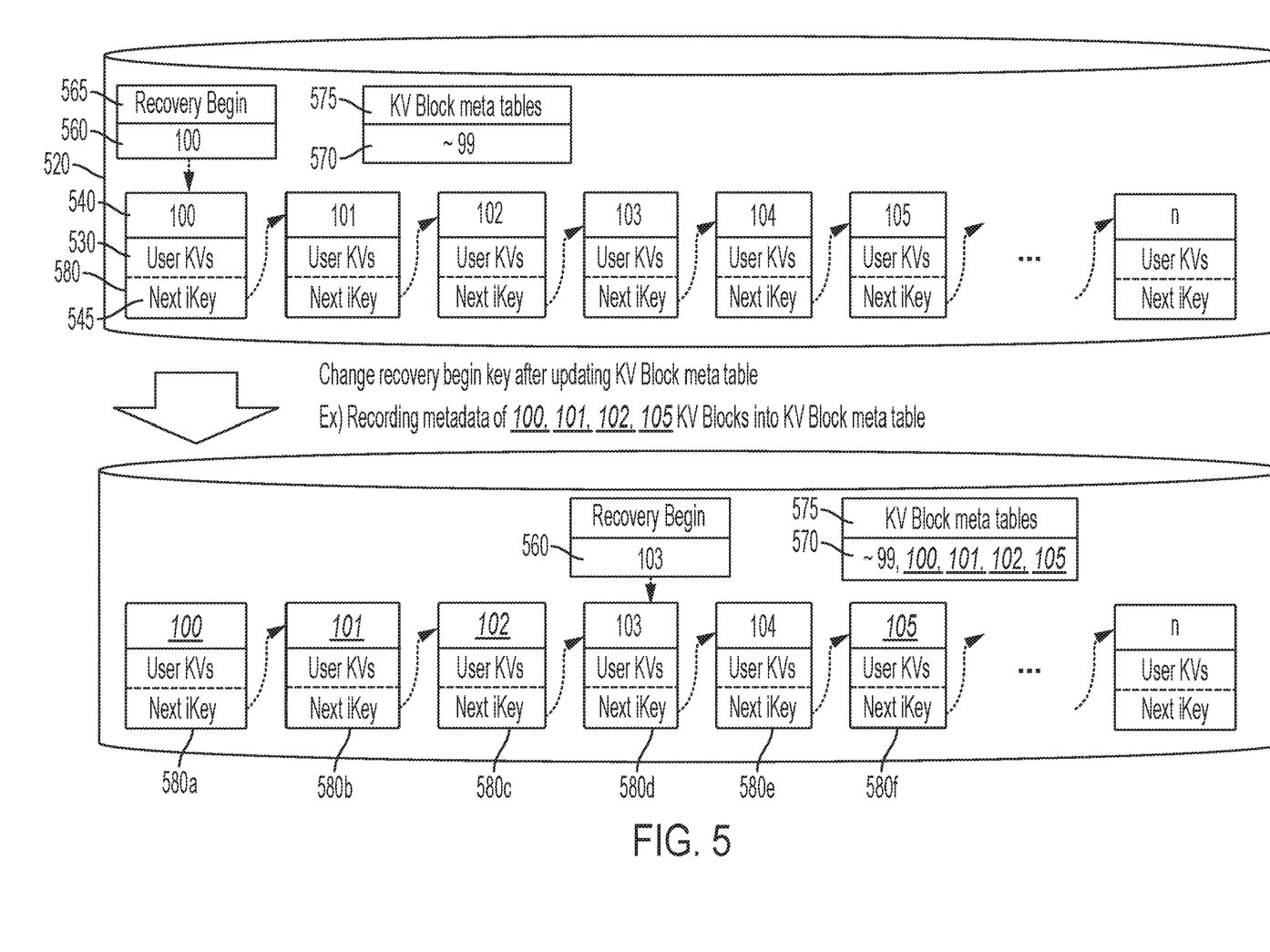
FIG. 5 is a block diagram depicting a method of updating a metadata table and a begin iKey in a KV device, according to embodiments of the present disclosure.

FIG. 5 is a block diagram depicting a method of updating a metadata table and a begin iKey (e.g., recovery begin internal key) in a KV device, according to embodiments of the present disclosure.

Referring to FIG. 5, an operation of building a KV block 580 may be demonstrated. For example, a brief overview of building a KV block 580 is as follows. First, an iKey may be appended, then, an iKey for a next KV block (e.g., next iKey 545) may be appended, and thereafter, the user keys and values (e.g., user KVs 530) may be appended to complete the KV block 580.

If the metadata 570 of one or more KV blocks 580 is stored in a corresponding metadata table 575, the begin iKey 560 will be changed to the iKey 540 of the earliest KV block 580 in the KV chain that is not indicated in the metadata table 575. The begin iKey 560 may be updated because KV blocks 580 that are referenced in the metadata table 575 may be assumed to have been successfully written to the KV device 520, and can be recovered without referencing the KV chain in the event of a system failure. Contrastingly, if the KV blocks 580 are not referenced in the metadata table 575, they are unable to be found without referring to the begin iKey 560.

After the begin iKey 560 is updated, KV blocks 580 that are indicated in the metadata table 575 and that precede the KV block 580 corresponding to the updated begin iKey 560 can be marked for deletion. Further, the KV blocks 580 that are subsequent to the KV block 580 corresponding to the begin iKey 560, or that are not referenced in the metadata table 575 cannot be deleted (e.g., even if a user deletes or updates all keys in the KV block 580), thereby ensuring that an unbroken KV chain can remain as the linked list.

For example, in FIG. 5, the KV blocks 580a, 580b, and 580c are able to be deleted after a user deletes or updates all of the respective key values 530 in these KV blocks 580a, 580b, and 580c. However, the KV block 580f is not able to be deleted, even though the KV block 580f is indicated as being included in the metadata table 575 and as having been successfully written to the KV device 520, because the intervening KV blocks 580d and 580e are not referenced in the metadata table 575. This is to ensure that the KV chain of the remaining KV blocks 580 is not broken. That is, because the begin iKey 560 is updated to point to the KV block 580d, which precedes the KV block 580f in the KV chain, the KV block 580f remains undeleted to ensure that the KV chain remains unbroken, and to ensure that all KV blocks 580 that are not yet updated or not yet referenced in the metadata table can be recovered in the event of a system failure.

In the event of a system failure, the recovery begin key 565 is accessed, and the begin iKey 560 is retrieved from the KV device 520 to initiate recovery after the system failure. Then, by using the begin iKey 560, the corresponding KV block 580 that is the first in the KV chain is read. By reading the first KV block 580 of the KV chain, the iKey 540 of the next KV block 580 may be retrieved. Accordingly, the next KV block 580 can be found and read. This process may be repeated until a KV block 580 of a read next iKey 545 does not exist in the KV device 520. After retrieving all KV blocks 580 that were not written the metadata table 575, the metadata table 575 may be updated, and the begin iKey 560 may be changed.

Because all KV blocks 580 that remain unwritten to the metadata table 575 can be located by simply locating the first KV block 580 of the remaining KV chain by accessing the recovery begin key 565 to use the begin iKey 560, due to the KV blocks 580 being linked by the links of the KV chain, a second, redundant write can be obviated without any risks to data consistency. Additionally, only the begin iKey 560 is stored, as opposed to a list of all unwritten KV blocks 580 (e.g., as opposed to the WAL/journal 260 shown in FIG. 2*a*).

Accordingly, embodiments of the present disclosure provide a KV chain with single or multiple user key values to avoid double writing for KV store consistency, and only keys outside of the recovery range can be deleted to prevent truncating the KV chain. If system has multiple write/submission thread/worker, multiple number of recovery begin 565 can be held in device. Each write/submission thread should have at least one recovery begin 565 in order to have its own write stream. Otherwise, chain can be broken because device cannot guarantee the write order.

Note that, KV devices guarantee atomicity for only one KV Block write. Further, embodiments of the present disclosure enable the recovery of the KV store (or system) from a system failure by using the KV chain mechanism. Further, embodiments of the present disclosure are able to achieve the above by a system that assigns device keys (iKeys) for KV blocks, and that forms a KV chain using the KV blocks for recovery, wherein a user key is embedded in a value of a corresponding KV block.

Advantages provided by the disclosed embodiments include no double writing of data, and no WAL is used for crash recovery. Accordingly, increased WAF and increased 10 bandwidth due to double writing can be reduced, and effective throughput can be increased, and recovery can be supported without sacrificing effective 10 performance.

What is claimed is:

1. A method of linking multiple KV blocks in a KV chain to ensure data consistency, the method comprising:
   allocating an internal key to both a first KV block and a recovery begin internal key;
   allocating a next internal key that is different from the internal key and that corresponds to a next KV block; and
   encapsulating respective user key values in the first KV block and in the next KV block,
   wherein the first KV block is accessed by reading the recovery begin internal key, and
   wherein the next KV block is accessed by reading the next internal key of the first KV block.

2. The method of claim 1, further comprising:
   updating all of the user key values of the first KV block;
   generating or updating a metadata table to reference the first KV block;
   marking the first KV block as being eligible for deletion from a KV device; and
   updating the recovery begin internal key to be the next internal key of the first KV block.

3. The method of claim 1, further comprising statically assigning a recovery begin key, wherein the recovery begin internal key is accessed by reading the recovery begin key.

4. The method of claim 3, further comprising, after a system failure of a KV device in which the first KV block and next KV block are stored:
   reading the recovery begin key from the KV device;
   retrieving the recovery begin internal key using the recovery begin key;
   locating and reading the first KV block using the recovery begin internal key;
   retrieving the next internal key of the next KV block from the first KV block; and
   locating and reading the next KV block using the next internal key.

5. The method of claim 4, further comprising:
   reading an additional next internal key as part of a device value of the next KV block, the additional next internal key corresponding to a subsequent next KV block;
   locating and reading the subsequent next KV block using the additional next internal key; and
   repeating until a corresponding next internal key corresponds to a KV block that is not found in the KV device.

6. The method of claim 1, further comprising:
   determining that the first KV block has no valid user key;
   marking the first KV block as eligible for deletion; and
   updating the recovery begin internal key to be the next internal key of the first KV block, the next internal key corresponding to a subsequent KV block.

7. The method of claim 1, wherein the next internal key comprises part of a device value in the first KV block, and comprises a device key for the next KV block.

8. A system for ensuring data consistency by implementing a KV chain, the system comprising:
   a processor implementing one or more KV devices comprising a key value store engine configured to:
      allocate an internal key to both a first KV block and a recovery begin internal key;
      allocate a next internal key that is different from the internal key and that corresponds to a next KV block; and
      encapsulate respective user key values in the first KV block and in the next KV block,
   wherein the first KV block is accessed by reading the recovery begin internal key, and
   wherein the next KV block is accessed by reading the next internal key of the first KV block.

9. The system of claim 8, wherein the key value store engine is further configured to:
   update all of the user key values of the first KV block;
   generate or update a metadata table to reference the first KV block;
   mark the first KV block as being eligible for deletion from a KV device of the one or more KV devices; and
   update the recovery begin internal key to be the next internal key of the first KV block.

10. The system of claim 8, wherein the key value store engine is further configured to statically assign a recovery begin key, wherein the recovery begin internal key is accessed by reading the recovery begin key.

11. The system of claim 10, wherein the key value store engine is further configured to:
   determine a system failure of a KV device of the one or more KV devices in which the first KV block and the next KV block are stored;
   read the recovery begin key from the KV device;
   retrieve the recovery begin internal key using the recovery begin key;
   locate and read the first KV block using the recovery begin internal key;
   retrieve the next internal key of the next KV block from the first KV block; and
   locate and reading the next KV block using the next internal key.

12. The system of claim 11, wherein the key value store engine is further configured to:
   read an additional next internal key as part of a device value of the next KV block, the additional next internal key corresponding to a subsequent next KV block;

locate and read the subsequent next KV block using the additional next internal key; and determine a corresponding next internal key corresponds to a KV block is not found in the KV device.

13. The system of claim 8, wherein the key value store engine is further configured to:

determine that the first KV block has no valid user key;

mark the first KV block as eligible for deletion; and update the recovery begin internal key to be the next internal key of the first KV block, the next internal key corresponding to a subsequent KV block.

14. The system of claim 8, wherein the next internal key comprises part of a device value in the first KV block, and comprises a device key for the next KV block.

15. A non-transitory computer readable medium implemented on a system for linking multiple KV blocks in a KV chain to ensure data consistency, the non-transitory computer readable medium having computer code that, when executed on a processor, implements a method of data storage, the method comprising:

allocating an internal key to both a first KV block and a recovery begin internal key;

allocating a next internal key that is different from the internal key and that corresponds to a next KV block; and encapsulating respective user key values in the first KV block and in the next KV block, wherein the first KV block is accessed by reading the recovery begin internal key, and wherein the next KV block is accessed by reading the next internal key of the first KV block.

16. The non-transitory computer readable medium of claim 15, wherein the computer code, when executed on the processor, further implements the method of data storage by:

updating all of the user key values of the first KV block;

generating or updating a metadata table to reference the first KV block;

marking the first KV block as being eligible for deletion from a KV device; and updating the recovery begin internal key to be the next internal key of the first KV block.

17. The non-transitory computer readable medium of claim 15, wherein the computer code, when executed on the processor, further implements the method of data storage by statically assigning a recovery begin key, wherein the recovery begin internal key is accessed by reading the recovery begin key.

18. The non-transitory computer readable medium of claim 17, wherein the computer code, when executed on the processor after a system failure of a KV device in which the first KV block and next KV block are stored, further implements the method of data storage by:

reading the recovery begin key from the KV device;

retrieving the recovery begin internal key using the recovery begin key;

locating and reading the first KV block using the recovery begin internal key;

retrieving the next internal key of the next KV block from the first KV block; and locating and reading the next KV block using the next internal key.

19. The non-transitory computer readable medium of claim 18, wherein the computer code, when executed on the processor, further implements the method of data storage by:

reading an additional next internal key as part of a device value of the next KV block, the additional next internal key corresponding to a subsequent next KV block;

locating and reading the subsequent next KV block using the additional next internal key; and repeating until a corresponding next internal key corresponds to a KV block that is not found in the KV device.

20. The non-transitory computer readable medium of claim 15, wherein the computer code, when executed on the processor, further implements the method of data storage by:

determining that the first KV block has no valid user key;

marking the first KV block as eligible for deletion; and updating the recovery begin internal key to be the next internal key of the first KV block, the next internal key corresponding to a subsequent KV block.

* * * * *